(12) United States Patent
Culleton, III

(10) Patent No.: US 11,942,824 B2
(45) Date of Patent: Mar. 26, 2024

(54) MULTI ROTOR AXIAL FLUX MACHINE ASSEMBLY

(71) Applicant: John Robert Culleton, III, Stafford, VA (US)

(72) Inventor: John Robert Culleton, III, Stafford, VA (US)

( * ) Notice: Subject to any disclaimer, the term of this patent is extended or adjusted under 35 U.S.C. 154(b) by 223 days.

(21) Appl. No.: 16/417,990

(22) Filed: May 21, 2019

(65) Prior Publication Data

US 2020/0373797 A1    Nov. 26, 2020

(51) Int. Cl.
| | |
|---|---|
| *H02K 1/20* | (2006.01) |
| *H02K 1/16* | (2006.01) |
| *H02K 1/2713* | (2022.01) |
| *H02K 3/12* | (2006.01) |
| *H02K 3/28* | (2006.01) |
| *H02K 3/48* | (2006.01) |
| *H02K 3/50* | (2006.01) |
| *H02K 5/20* | (2006.01) |
| *H02K 16/02* | (2006.01) |

(52) U.S. Cl.
CPC ............... *H02K 1/20* (2013.01); *H02K 1/165* (2013.01); *H02K 1/2713* (2013.01); *H02K 3/12* (2013.01); *H02K 3/28* (2013.01); *H02K 3/48* (2013.01); *H02K 3/50* (2013.01); *H02K 5/203* (2021.01); *H02K 16/02* (2013.01)

(58) Field of Classification Search
CPC .... H02K 1/182; H02K 1/2793; H02K 21/026; H02K 21/24; H02K 37/08; H02K 37/125; H02K 49/046; H02K 49/108; H02K 3/04; H02K 3/505; H02K 17/20; H02K 17/205; H02K 1/20; H02K 1/165; H02K 1/2713; H02K 5/20; H02K 16/02; H02K 3/50; H02K 3/48; H02K 3/12; H02K 3/28; H02K 16/00
USPC ........................................ 310/201, 112, 114
See application file for complete search history.

(56) References Cited

U.S. PATENT DOCUMENTS

| | | | | | |
|---|---|---|---|---|---|
| 3,292,024 | A | * | 12/1966 | Kober ...................... | H02K 3/04 310/201 |
| 5,619,087 | A | * | 4/1997 | Sakai ...................... | H02K 1/12 310/156.36 |
| 6,768,239 | B1 | * | 7/2004 | Kelecy ..................... | H02K 3/04 310/179 |
| 8,022,593 | B2 | * | 9/2011 | Lamperth ............. | B60L 3/0061 310/268 |
| 2002/0175588 | A1 | * | 11/2002 | Rajasingham ........... | H02K 3/47 310/179 |

(Continued)

FOREIGN PATENT DOCUMENTS

GB       2358523    *    7/2001

*Primary Examiner* — Ahmed Elnakib
(74) *Attorney, Agent, or Firm* — Roman Aguilera, III

(57) ABSTRACT

An axial flux electrical machine, such as an electric motor, dynamo, pump, generator, or alternator has a casing with vents or openings enabling cooling or pumped media to flow into and out of the casing when the rotor of the electrical machine rotates. The stator is formed from conductive elements connected at their axial outer regions by interconnecting members. Conductive elements have a gap or space to direct cooling through the winding to the central region. A portion of the windings of the stator are spaced apart to allow media to flow between the windings to the central axis area and then is allowed flow outward between the rotor and the stator.

20 Claims, 13 Drawing Sheets

(56) References Cited

U.S. PATENT DOCUMENTS

2006/0267439 A1* 11/2006 Rajasingham ........... H02K 3/12
                                                                              310/179
2008/0042515 A1* 2/2008 Butterfield ............. H02K 5/225
                                                                              310/268

\* cited by examiner

MULTI ROTOR AXIAL FLUX MACHINE ASSEMBLY

CROSS-REFERENCE TO RELATED APPLICATIONS

62/830,386.
62/696,435.

STATEMENT REGARDING FEDERALLY SPONSORED RESEARCH OR DEVELOPMENT

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Axial flux machines are known for their high-powered capabilities in flat or compact packages. A downside to this compact design is high power requires high current which creates substantial amounts of heat that cannot be easily dissipated. Overheating in these machines can lead to the failure of magnets, wire insulation, and electrical connections.

Axial flux machines generally use an open frame for cooling low to medium power machines, which is inadequate for machines of more than two rotors as most of the coolant media is often brought in axially. On machines where coolant is brought in radially it is often required to be under pressure or have channels through the rotor which weakens them.

Higher power axial flux Machines are often fed coolant under pressure as the natural rotation of the machines rotors tends to resist coolant being introduced between rotors and stators and energy is wasted driving a pump required to overcome rotors tendency to force coolant outward when spinning.

Axial flux machines are hard to assemble in configurations of more than two rotors due to the electrical connections between rotor and/or stator elements and extreme magnetic forces involved. Coolant entering axially from the ends of the machine make it difficult to cool inner rotor and/or stator element(s) on multiple element arrangements without placing holes in the rotor(s), or using a hollow shaft with holes, or other method that weaken the overall integrity of the motor.

Many machines have interconnections and electrical joints that require care in assembly and are potential points of failure due to fatigue or overheating, often requiring complete disassembly to repair. The number of interconnections multiplies by the number of rotors, increasing the chances of a failure, and cumulatively increasing resistance with each interconnection, reducing efficiency.

Axial flux machines often have rotating phase windings with stationary flux generators (magnetic sources) that often make the rotating windings physically vulnerable to sudden shocks and jolts causing the windings to flex or disassemble especially where joints or connections cross over/under the rotor centerline.

Some machine designs allow for rotating magnetic sources but again are usually limited to 2 rotors and a large diameter because it is difficult to manage the powerful magnet plates and windings during assembly.

Disassembly of a conventional axial flux motor is often difficult, dangerous, or impractical due to the large magnetic forces involved that often leads to damage or destruction of the machine's major components, making cost of repair unreasonable.

Some axial flux machines are assembled with permanent magnets that are not magnetized and are magnetized after the structure is complete making another construction step requiring up to thousands of amps being sent through a sacrificial conductor inside the case. Present axial flux machines that contain more than 2 rotors are often multiple separate machines bolted together in a special fixture causing control, connection, and mounting issues with the additional mounting hardware, frame(s), and control connection (s) increasing weight, size, and complexity due to the increased number of bearings, endplates, structural supports, and electrical connections.

Axial flux machines often have the commutated portions of windings (such as those in a printed disc motor or lynch motor) that lean or arc in opposite directions making placement of a flux enhancing material, such as ferrite or silicon steel or other suitable material, that passes through the windings difficult or impossible. Axial flux machines often have a large diameter to get the needed torque and thus have lower RPM ranges.

FIELD OF THE INVENTION

The present invention is an improvement to current axial flux machines, better known as pancake motors, generators, or pumps with self-pumping action for cooling media, or other media through the internal bodies of the machine and a method of assembly.

BRIEF SUMMARY OF THE INVENTION

An axial flux machine that overcomes the common limitations previous machines by increasing number of rotor and/or stator members providing cooling/media path(s) through the central body of the stator and/or the rotor.

Depending on configuration, as an out-runner (case rotates, axis stationary) or an in-runner (case stationary, axis rotates), a plurality of rotors, (hereafter describing an in-runner with windings placed as an outer stator although placing the windings on the central axis is similar in concept except the coolant would have to flow between magnetic sources vice windings first), and stator segments have quasiindependent, (a media path per rotor or rotor surface), coolant media or pumping media path, (hereafter called coolant), allowing a plurality of rotor(s) to share a common central axis shaft thus being compact and efficient without complex internal interconnected coolant circuits and a multitude of electrical connections.

An advantage of the winding design and coolant path in the present invention is a plurality of rotors allowing for great torque while maintaining a higher RPM range than previous designs that specifically use two or less large rotors.

The coolant or media would travel at least once from the periphery into the machine towards and near to the central axis providing cooling to the windings internally, and then pass from the windings into the area between the stationary portion and the rotating portion allowing coolant to flow and be drawn outwards towards the periphery cooling both the rotor and stator before exiting the internal portion of the windings.

Another object of this patent is to create a machine with stator and rotor arrangements that overcome negative issues in prior art and allow a continuous conductor for each winding section to be placed between multiple rotors depending on configuration and allow assembly with minimal electrical connections or joints.

With no joints or electrical connections needing to cross over, (or under depending on configuration), a rotor simply adding rotors and/or stators to the machine's design will not necessarily increase the number of electrical joints or connections thereby reducing overall resistance and failure points.

These and other objects of this patent are a machine with stator and rotor arrangements that reduce weight, allow for an increased number of rotors or stators (depending on configuration) to be assembled on a common central axis and, unlike previous methods of stacking complete motors with endplates and/or bearings on the same shaft, provide better internal media flow for cooling, or pumping, as well as a single location for input or commutation and a continuous flux path axially from end to end without the need for intermediate flux back iron, or flux termination plates, and/or bearings that multiple motors assembled together require.

Structural integrity is greater by placing the windings in the stator so that sudden jolts or shocks to the rotating members have little effect on windings structure and electrical connections especially since all electrical connections and winding interconnections are at the extreme ends of the central axis.

Another benefit of having electrical connections and winding segment interconnections at the axial ends of the machine is easy access for connections and/or repair or winding reconfiguration. Another advantage of this design allows powerful magnets or electromagnets to be placed in or on a rotor, or stator, (depending on configuration), and the rotor(s)/stator(s) to be assembled using magnetized permanent magnets, Halbach arrays, or electromagnets or any combination thereof without the rest of the assembly in the way. The windings could then be placed around and/or between the fully powered magnets without danger of case parts or rotors slamming together or of damage to the windings. Any bridging between conductive elements would be minimal and generally at either end of the machine to would not require complete disassembly of the machine to effect repairs. The present design would allow ferrite or flux enhancing material such as silicon steel to be easily placed between windings during assembly and allow both axial ends of said flux enhancing material piece to be exposed to the rotors magnetic flux parallel and flush with the individual winding segments.

These and other objects of the invention are attained by providing a path for coolant or other media path through the interior of the machine accompanied by the use of composites or other lightweight mostly nonferrous and/or nonconductive support materials used in either the rotor(s) and stator(s) or any combination thereof with rotor(s) and stator(s) placed in close proximity of each other's face and directly in the flux path to assist or generate movement of said coolant or other media from the outer periphery of one element through that element to flow near the center axis and then flow between stator and rotor element(s) or by pumping media between elements towards the central axis and then through element(s) back towards the periphery while limiting the number of necessary electrical joints or connections by using continuous conductors axially through the machine. Further this machine could have the windings placed on the central axis (rotating or stationary styles) and still have the benefit of continuous winding segments without extra interconnections by inverting the leg arrangement used for the stator's windings. Further improvements can be attained by staggering the segment portions on both the inner plane and outer plane to increase coolant or pumped media flow.

DETAILED DESCRIPTIVE ELEMENTS

Figure 1:
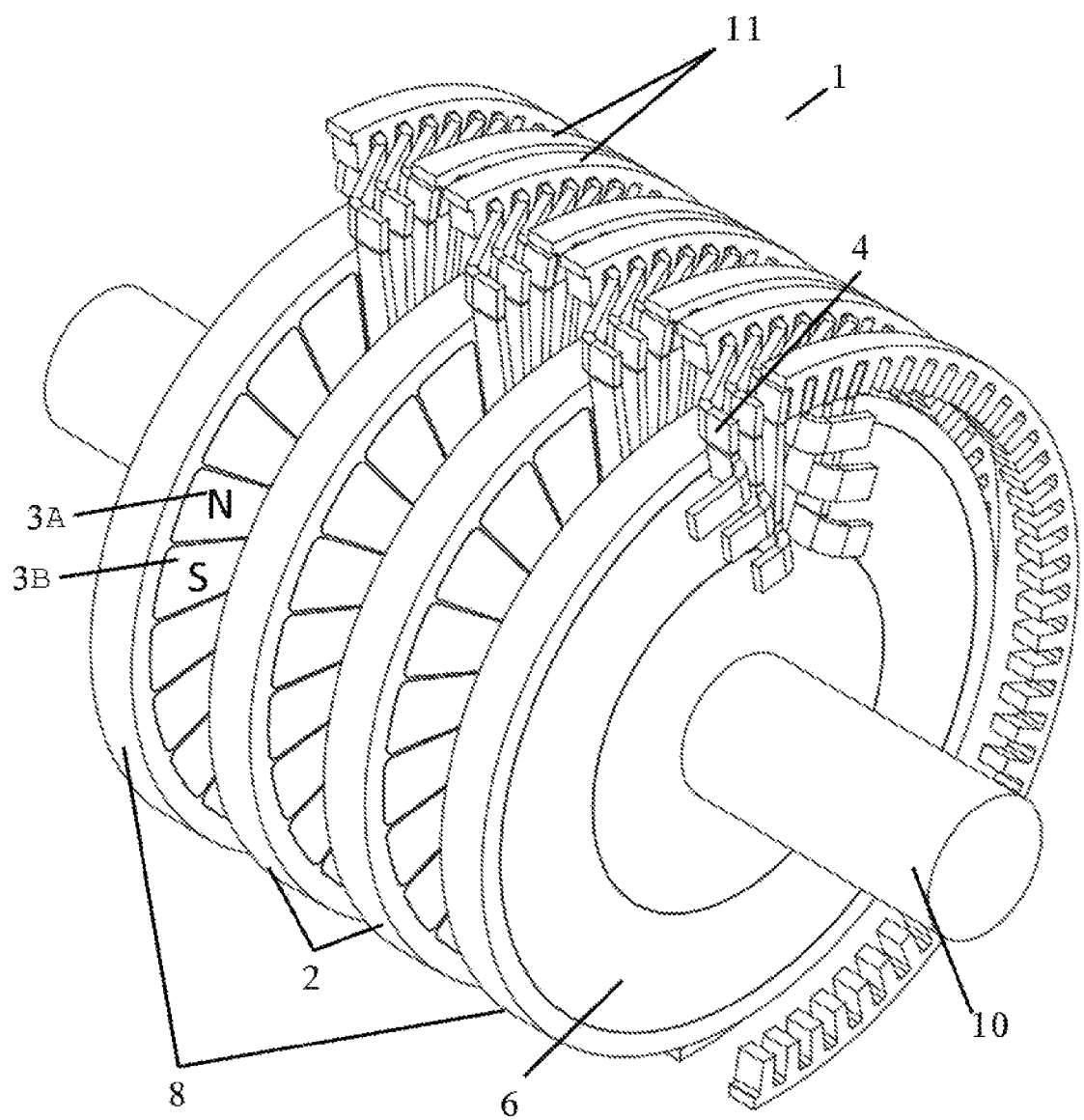
FIG. 1 Typical rotor arrangement with rotor mounted flux termination rings.

An ideal embodiment FIG. 1 of the present invention an axial flux machine 1 typically used as a generator, motor, or pump that has a central axis with a shaft 10 and a plurality of inner rotors 2 in this embodiment numbering 2 arranged on said shaft with circumferentially disposed magnetic flux generators such as electromagnets or permanent magnets 3A, 3B, in this case 24 per permanent magnets per said inner rotor(s) with opposing adjacent sides of said rotor alternating in polarity 3A,3B in a standard configuration. Outer rotors 8 have flux terminators 6 attached to them preferably out of some soft ferromagnetic material to complete the axial flux magnetic path in the case of standard magnetic fields.

Circumferentially dispersed around said rotors is a plurality of conductive windings 4 with a typical winding segment having a continuous conductor with joints or connections taking place beyond outer rotors 8 usually near the flux termination ring but not in the direct flux path generated by flux generators affixed to said rotors.

A plurality of winding spacer(s) example 11 may be used to stabilize windings during assembly and direct coolant or pumped media during operation.

Figure 2:
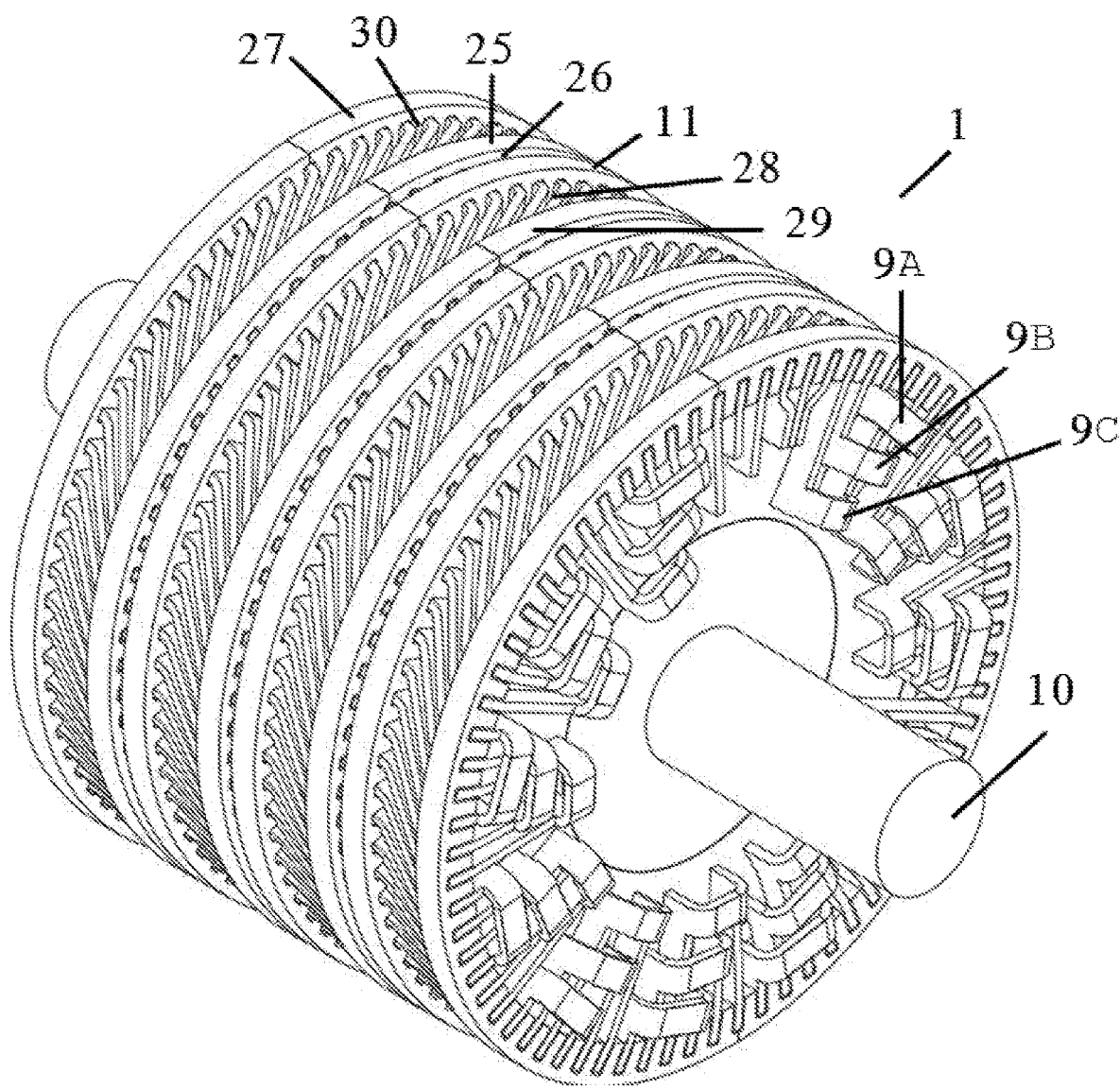
FIG. 2 Typical windings with stabilizer rings and interconnects.

FIG. 2 Winding segments are circularly arrayed about the central axis of axial flux machine 1 in a 360-degree fashion. In this embodiment segments are connected in a typical 3-phase arrangement with separate phases interconnections kept on a separate circumferential plane in relation to the axis and shaft 10 for ease of interconnecting and troubleshooting although alternate winding connections are possible due to all the winding segments interconnections or bridges 9A, 9B, 9C, respectively, outside of the flux path and are easily reconfigured by removing end-bells or bearing supports (not shown). In the gap between two example spacers 11,25 is an example of media entrance area into machine windings 26 (casing, bearings and supports removed for clarity) and an exit area(s) 28 and 30, formed in the gap between example spacers 11, 29 and spacers 25,27 respectively, for the media fed into area 26 after it has flowed between windings depicted, into an area close to central shaft and exiting between windings and rotor(s) on either side of spacer 25 and spacer 11 not facing gap 26. Example spacers may be made as a single part or part of the case (not shown) or joined in groups or even a single piece if desired or done away with in alternative embodiments.

Figure 3:
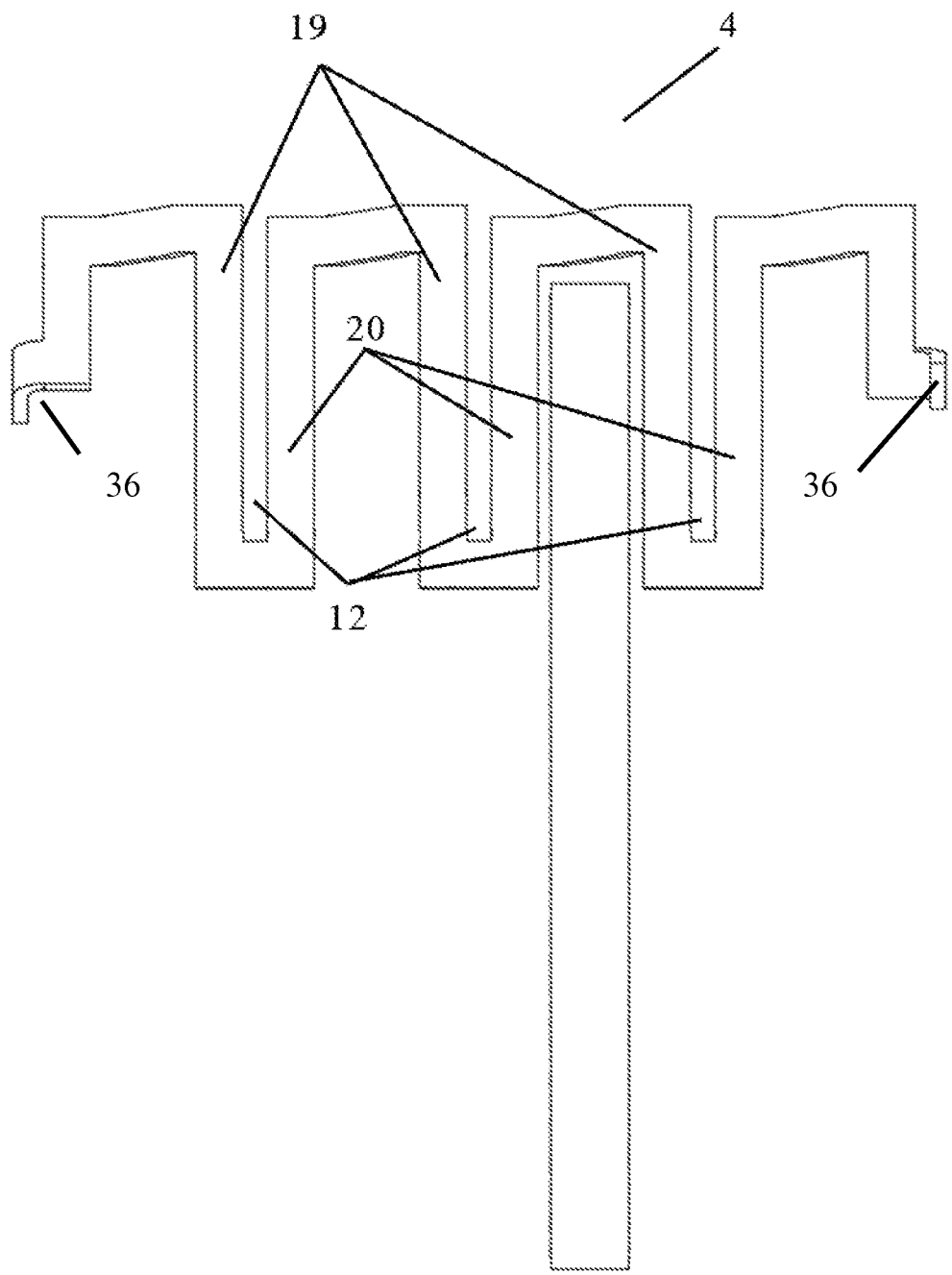
FIG. 3 Typical windings with media gap and leg portions.

FIG. 3 typical winding segments such as winding 4, from FIG. 1, have gap(s) formed 12 for coolant or pumping media to flow from the exterior area to the inner area of the windings. Depicted are asymmetrical end connections 36 for a single phase. Each winding segment has portions that lie between two rotors and each of these portions have two legs, leg A 19 and leg B 20 although flat windings are shown windings can be flat, round, hollow, twisted wire, litz wire or any other shape conductor.

Figure 4:
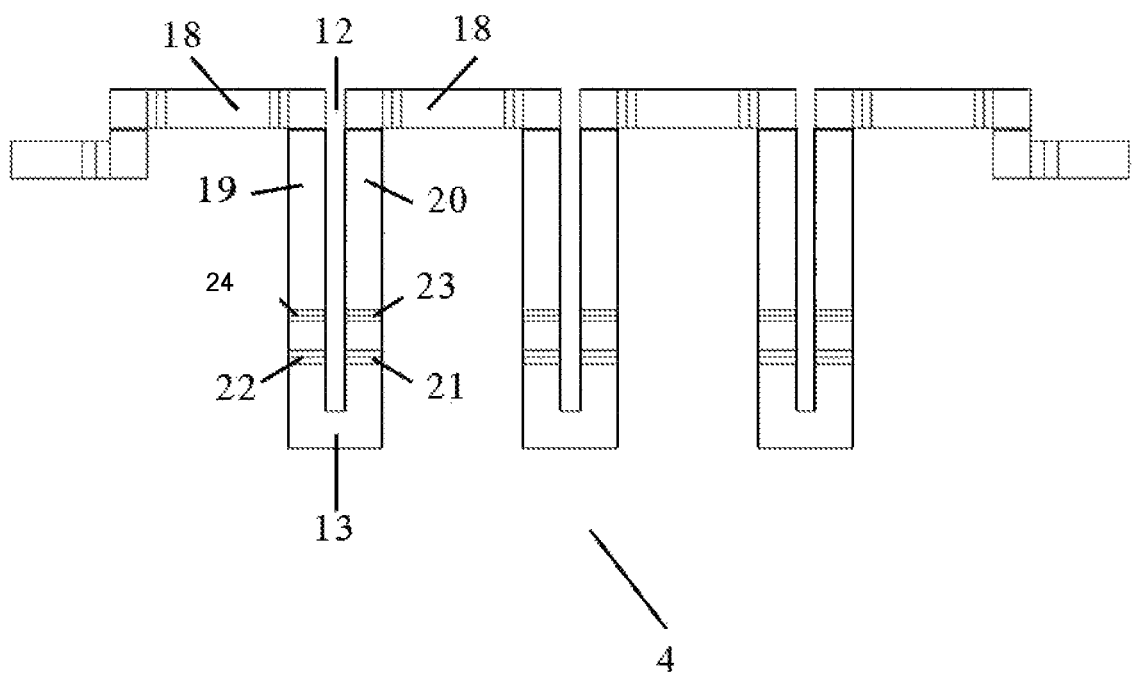
FIG. 4 Typical windings as in FIG. 3 with bends shown in flat view for standard rotors.

Flat diagram FIG. 4 depict a typical winding segment of a particular phase's bends that allow two legs depicted 19,20 with 19 being leg A and 20 being leg B. Bends are depicted here as 21, 22, 23, 24, which are only indicated on one portion of the typical winding segment 4. Each winding portion has an outer axial cross piece(s) 18 and an inner axial cross piece 13 with 18 extending axially across a rotor and 13 extending axially between two rotors. Other configurations and bends are possible.

Figure 5:
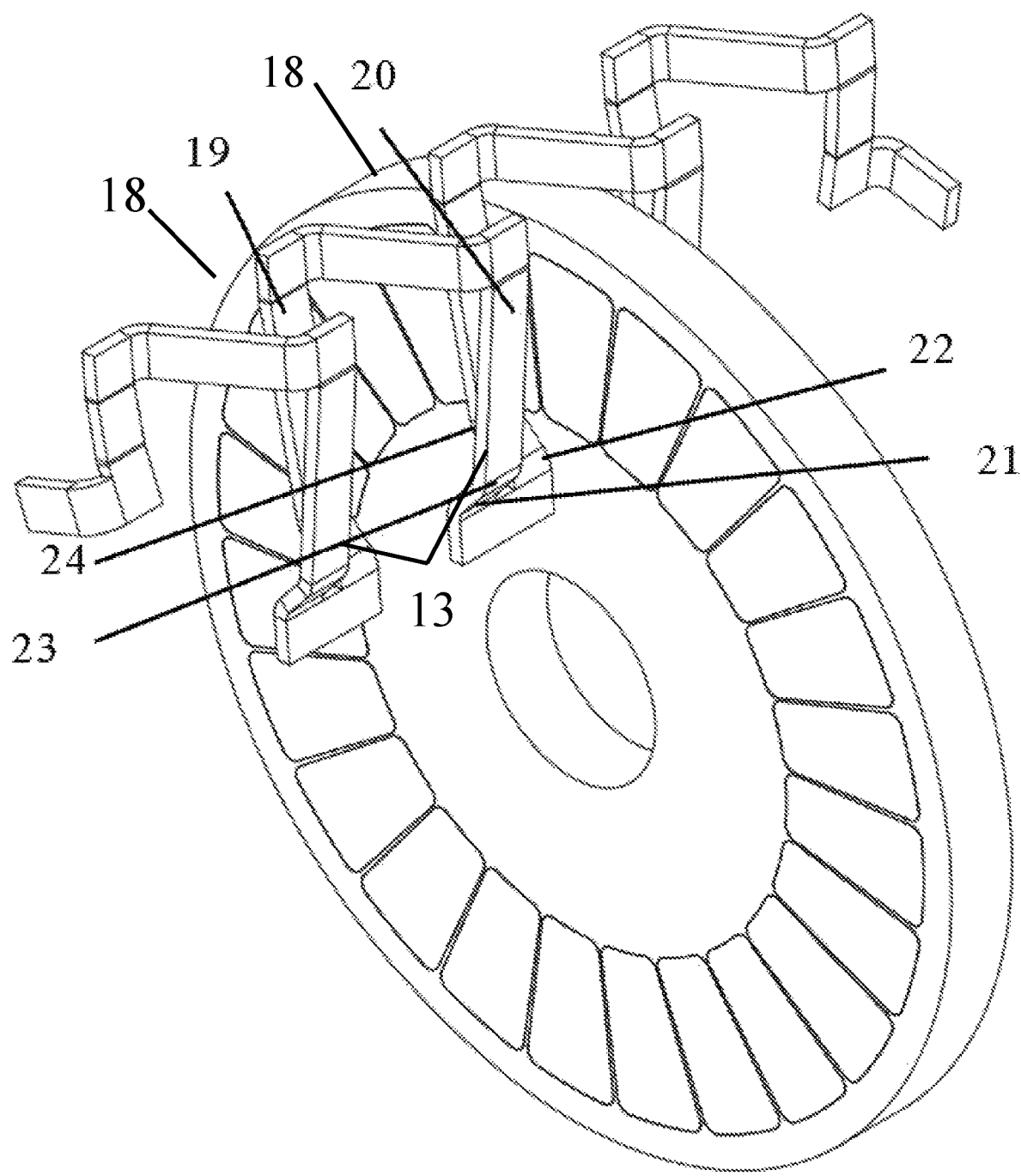
FIG. 5 Typical windings as in FIG. 4 perspective view with flux generators (permanent magnets).
Figure 6:
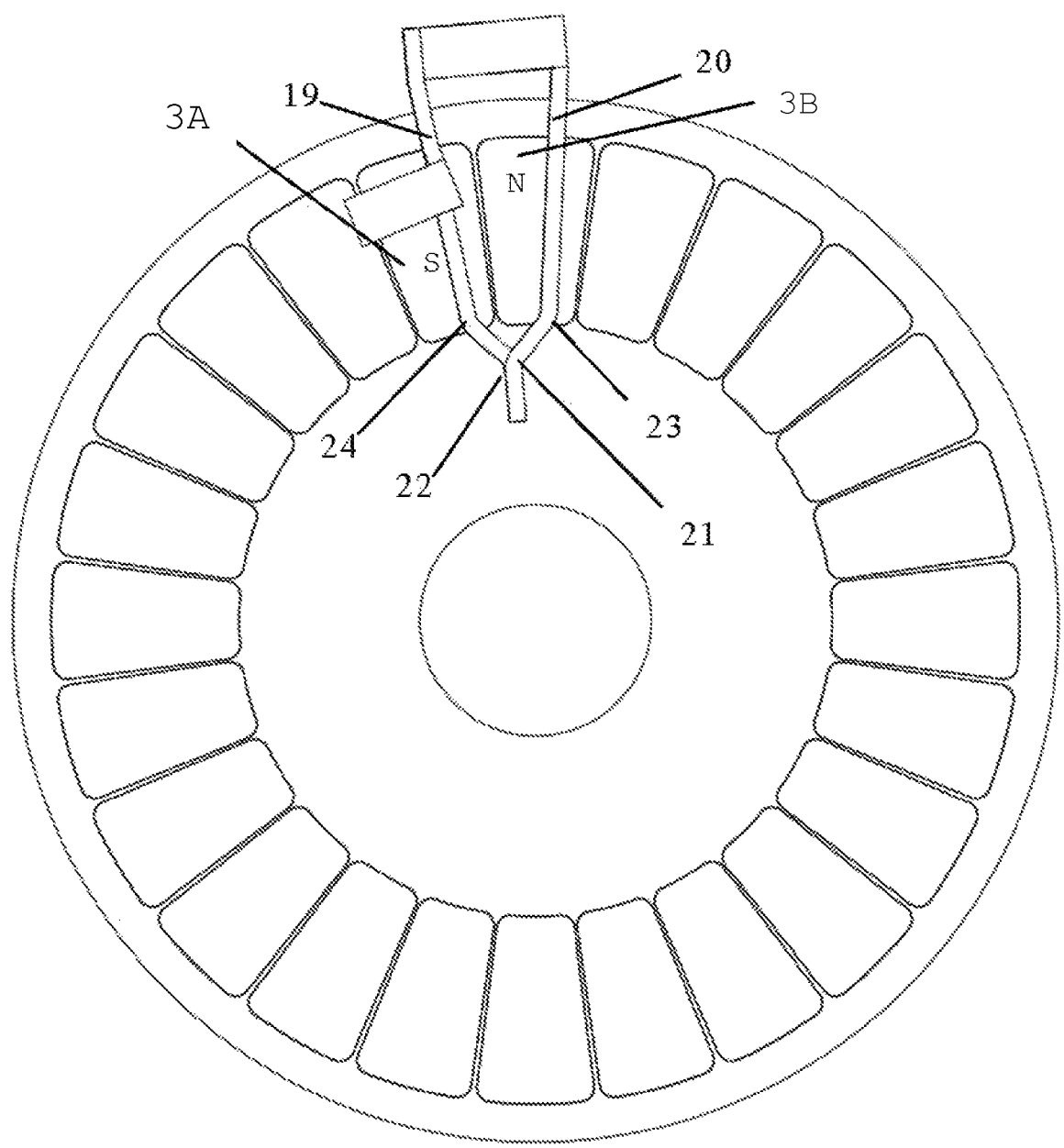
FIG. 6 Typical windings as in FIG. 3 from end view or axial view.

FIG. 5 and FIG. 6 Perspective and axial or end views of typical bends needed for leg A 19 and leg B 20 to cross magnetic flux paths when current is flowing through the winding. Bends 22, and 24 are formed to allow leg A 19 to cross a magnetic flux path of a permanent magnet 3B in one direction and bends 21, and 23 are formed to allow leg B 20 to cross a flux magnetic path permanent magnet 3A in the opposing direction so when current flows down one leg and back up the other force is generated upon the rotor in a common direction. Also shown are cross pieces 18 and 13.

Figure 7:
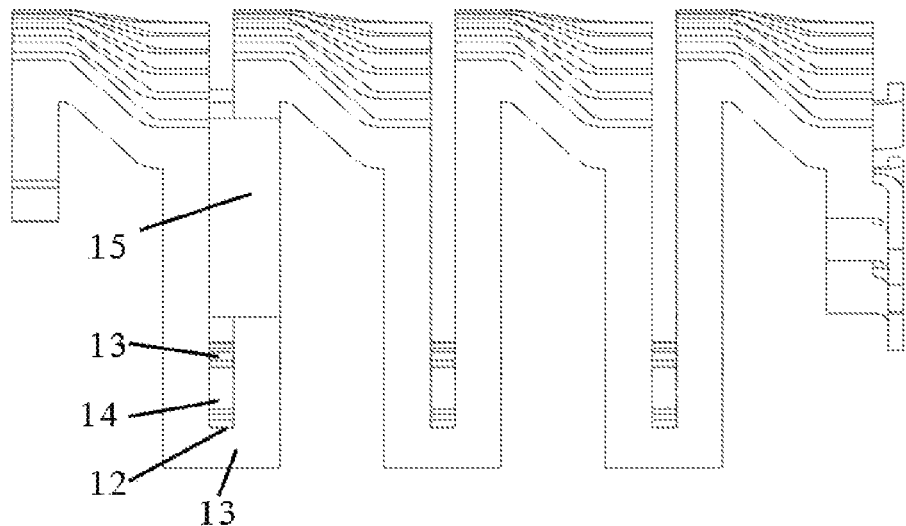
FIG. 7 View of typical interleaved windings with cores (flux enhancers) and epoxy.
Figure 7:
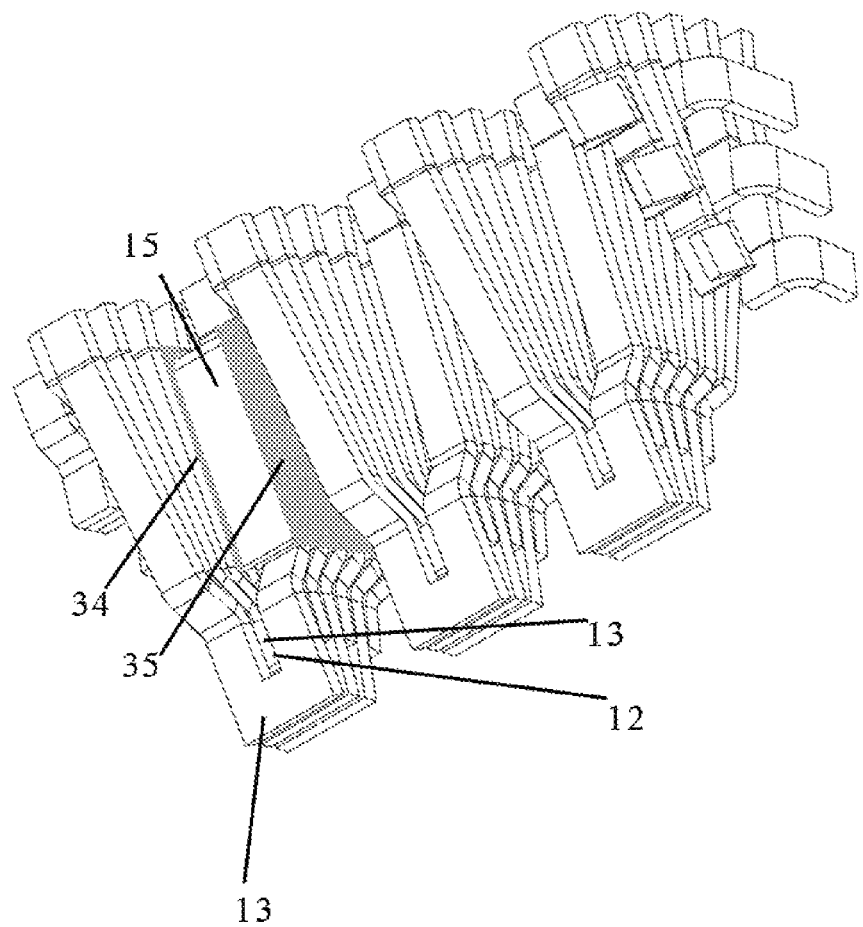

FIG. 7 depicts 6 winding segments connected in pairs of 2 typical of a 3-phase arrangement in normal and perspective view. Shown is said gap 12 and axial cross pieces 13. Between two adjacent windings piece 13 a gap or space 14 may be formed, if needed, by extending other winding(s) length to allow media to flow when windings are extremely tightly packed. Depicted are flux enhancers or core material 15 preferably made of electrical steel, Ferrite, or some other soft magnetic material that can be used to increase the flux density and magnetic attraction between rotors and direct media flow between adjacent windings. Between each leg A and leg B epoxy (shaded area) or some other glue-like material may be used between winding legs and flux enhancers to secure them in place. While epoxy, fiberglass, phenolic paper, or other suitable surface 35 providing definition to media path between the windings, rotor(s), and gap 12

Figure 8:
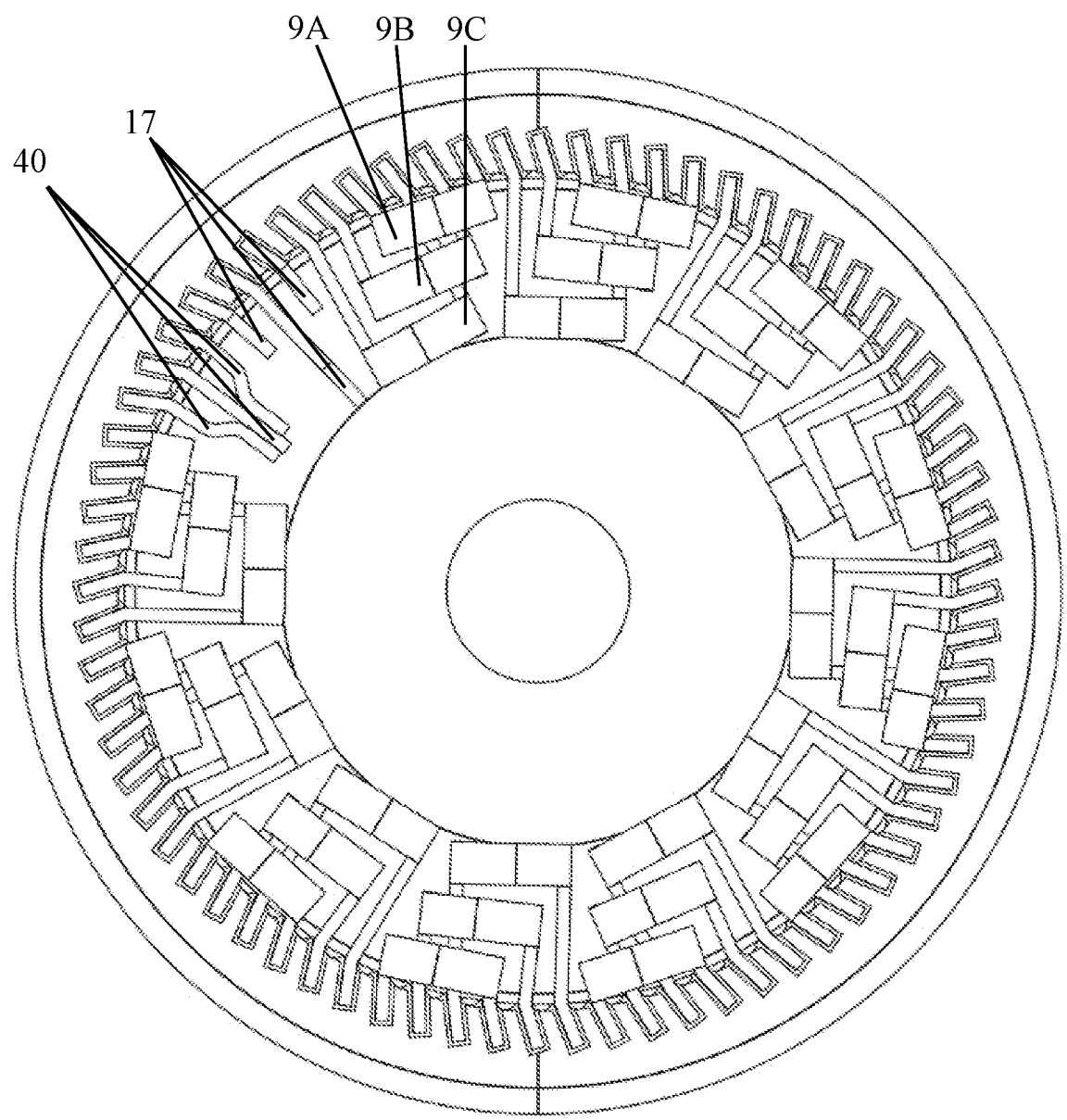
FIG. 8 Axial end view of a motor with interconnects and phase connections depicting a typical 3 phase arrangement.

FIG. 8 depicts winding interconnections for a typical 3 phase segment interconnects, 9A, 9B, 9C and atypical Y phase connectionbetween the three phases 40 and external connections 17 from one axial end of said machine.

Figure 9:
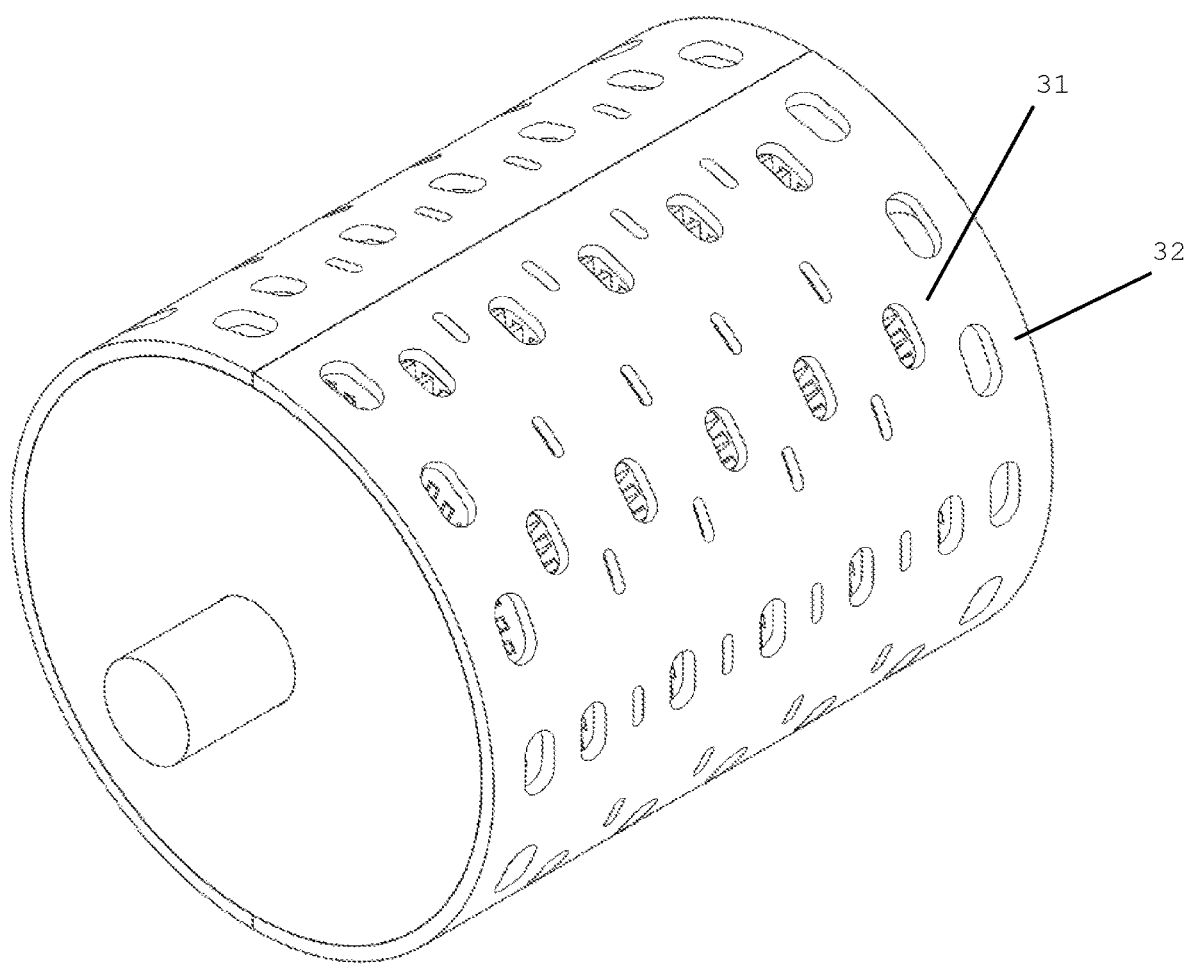
FIG. 9 Perspective view of a motor case with typical inlet and outlet openings.
Figure 10:
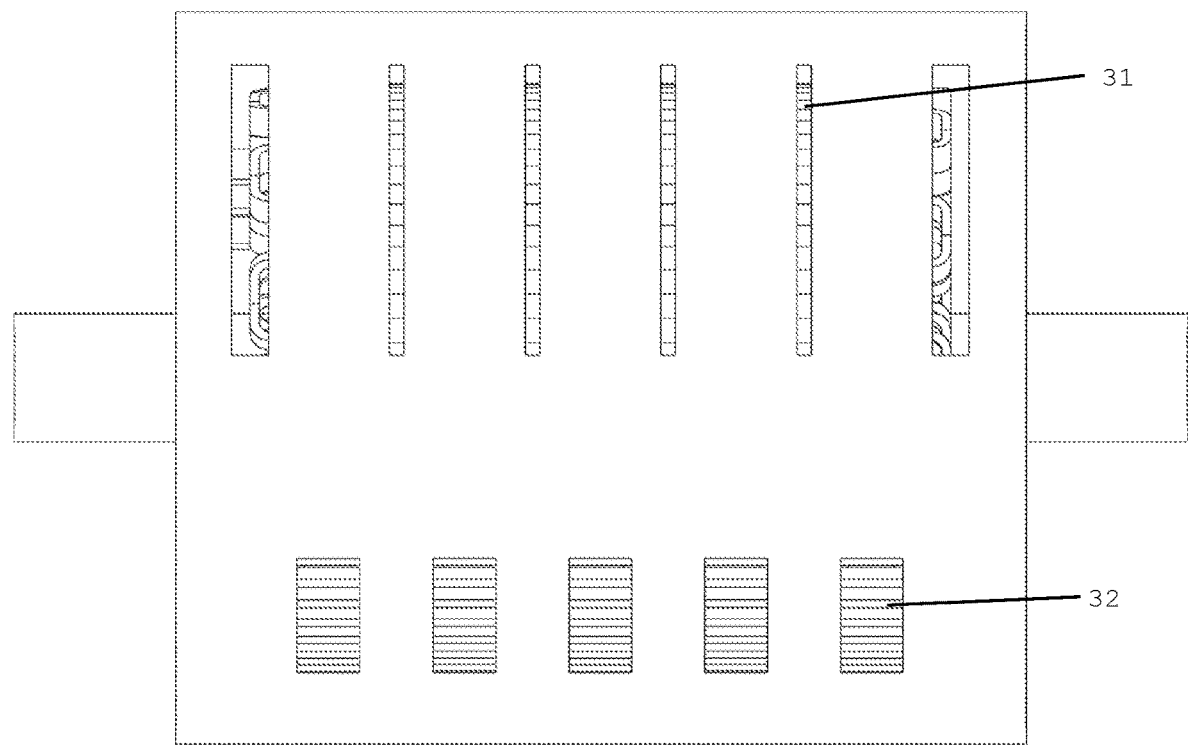
FIG. 10 Alternate side or radial view of 9.

FIGS. 9 and 10 show examples of case entrance and exit openings for coolant or pumped media to flow. Openings may be arranged so that all entrances are on one portion of the case and all exits on another or arrayed around the case as depicted in examples case 8 openings 31, 32 or in arrangements such as 9 for convenience of mounting manifolds, outer coolant case, or partial submersion of said machine into media or coolant.

Figure 11:
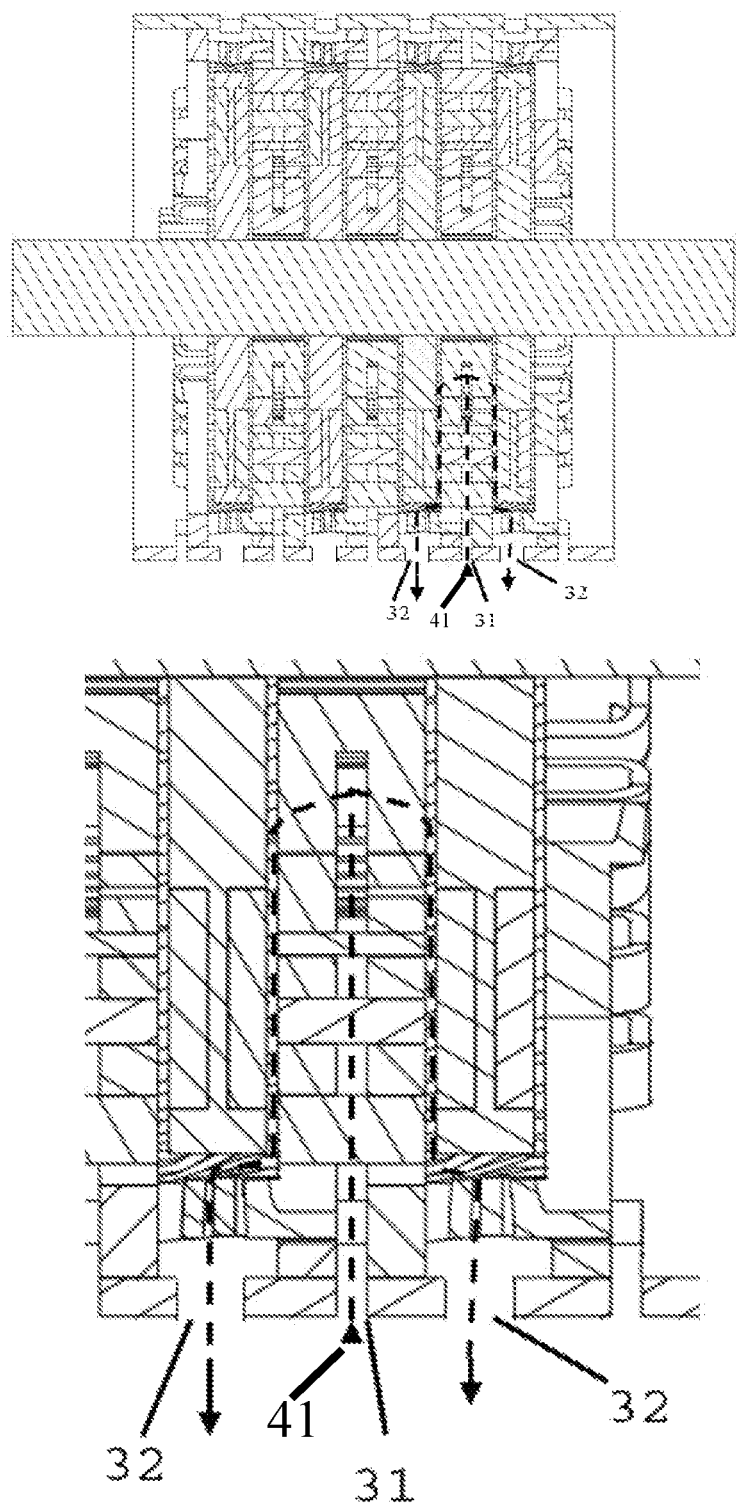
FIG. 11 Cross section view showing coolant or media path through a segment portion.

FIG. 11 depicts a cross section of machine depicting a single media path flowing 41 as a dotted line from outside of the machine opening case 31 down through the windings and returning between the windings and rotors before exiting the case through opening 32.

Figure 12:
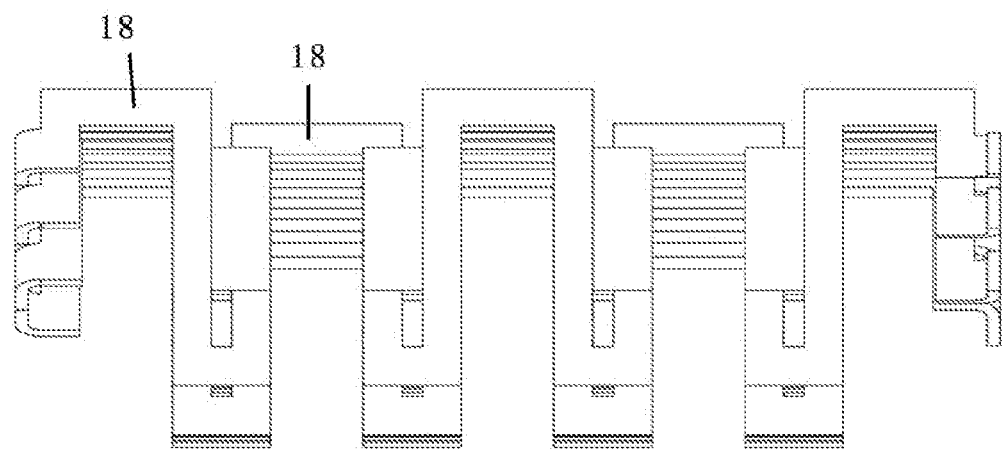
FIG. 12 Typical winding for use with halbach array rotors.
Figure 12:
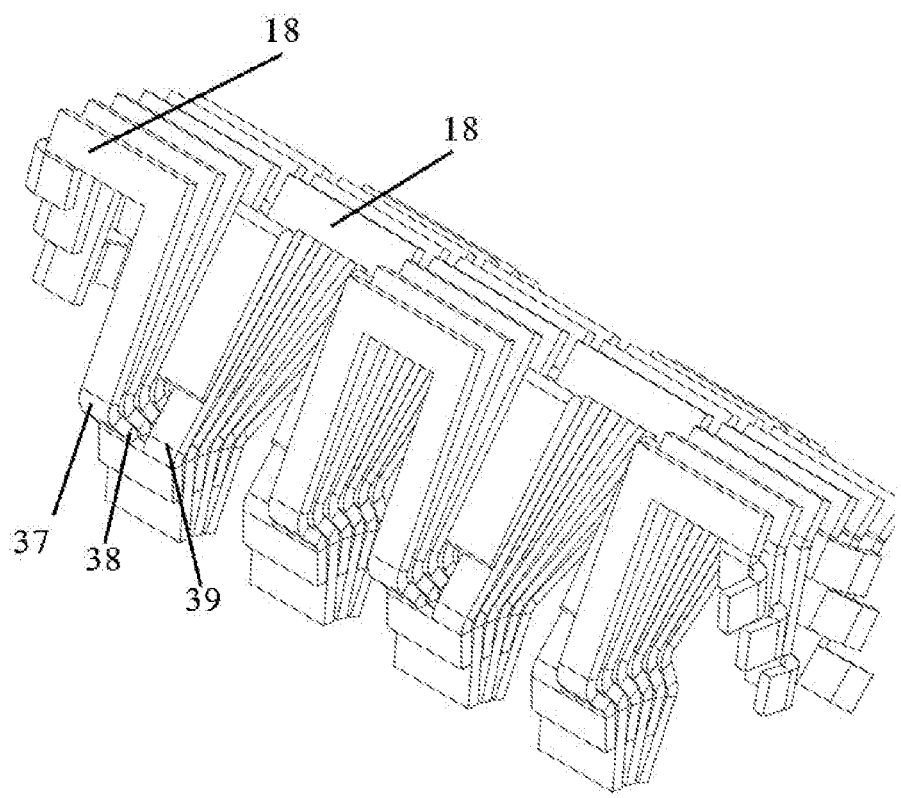

FIG. 12 depicts an alternate winding in normal and perspective views that may be used for rotors with Halbach arrays instead of conventional permanent magnet arrangements with the main difference being 18 now being generally straight and the change in bends depicted as 37, 38 and 39.

Figure 13:
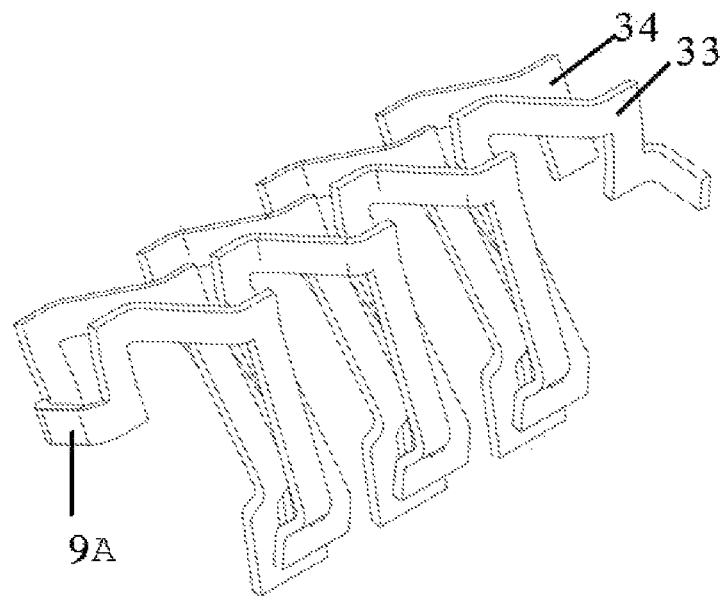
FIG. 13 Typical winding with two interconnected segments.
Figure 13:
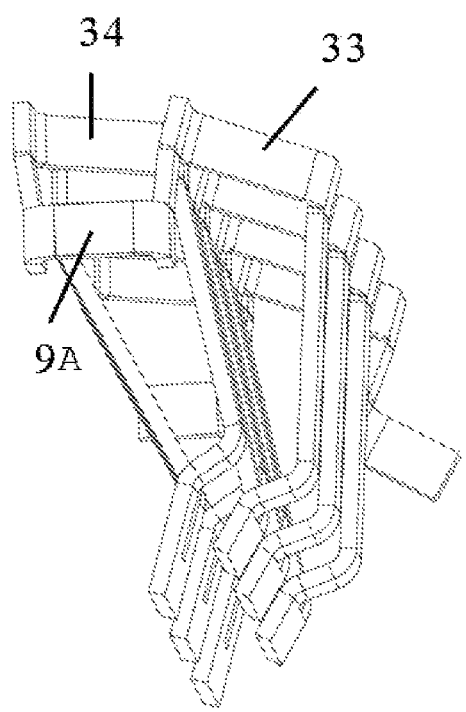

FIG. 13 depicts a typical single winding consisting of two connected segments 33, 34 showing bridge or interconnector 9A to better show multiple segment electrical path.

What is claimed:

1. An axial flux electrical machine, having a plurality of circumferentially arranged current-carrying stator segments with distributed stator portions that lie in at least one stator plane perpendicular to the rotational axis and lie in at least one stator plane parallel to said axis with current flowing in an axial direction between portions along said stator segment allowing current to pass a plurality of faces of an individual rotor and multiple a plurality of rotors per stator segment.

2. The machine in claim 1 wherein said stator portions have a slot between legs of said portion for coolant.

3. The machine as in claim 1 with said stator segments electrical connections, bridges or interconnections, and or solder joints between said segments occur beyond the axial extents of axial flux generated between first and last flux generating rotors within said machine.

4. The machine as in claim 1, with said stator comprised of interleaving stator segments with said stator segments having formed a slot between portion of at least 2 legs of said stator segment that is of an asymmetrical length radially to other stator portions allowing for a pathway being formed between adjacent portions slots near the central axis of said electrical machine for coolant flow.

5. The machine as in claim 1, with said stator segments have a formed slot between portion legs of said stator segment with said legs being asymmetrical to one another allowing for each leg of said portion to cross flux paths of opposite polarity, generated by a magnetic source consisting of magnets, or electromagnets, or coils, or Halbach array, or any combination thereof, in, on, or otherwise attached to a rotor.

6. The stator as in claim 1 that has stator portions placed parallel and near a rotor presenting a surface created by the winding segments, and core material adjacent to said rotor that during rotation allows adhesion or boundary layer type effects to propel, draw, or move coolant from the inner region near the central shaft to the outer region as the rotor turns about the central axis with or without assistance from vanes, blades,. protrusions or surface roughening treatments.

7. The stator as in claim 1 that allows coolant to travel from the outer region of the machine to the inner region of the machine and then to travel from the inner region to the outer region parallel to a rotor face with said coolant not having to pass any other rotor faces before exiting machine stator windings.

8. The stator as in claim 1 that has flux enhancing material between stator sections and or portions that assist or direct coolant towards the central axis.

9. The rotor as in claim 1 having a plurality of flux generating devices arranges in a dual Halbach pattern on alternating sides of rotors.

10. The rotor as in claim 1 having a plurality of flux generating devices on, or in, or otherwise attached to said rotors spaced circumferentially in a manner as to generate magnetic flux axially from at least one of the parallel faces of said rotor.

11. The machine as in claim 1 that has axial flux termination or flux return devices near either axial extent of said machine attached to the outermost faces of the outermost facing rotor(s).

12. The machine as in claim 1 that has flux termination or flux return device(s) that are affixed to the machine beyond outermost parallel faces of outermost rotors.

13. The machine as in claim 1 that has rotating flux termination devices attached to the central axis shaft.

14. The machine having at least one stator as in claim 1 and a casing or shell that has at least one coolant opening(s) that allows media to flow into and out of said casing,. first passing through stators and then past a rotor face exiting casing through at least one other openings with openings being radically or axially disposed in the outer portion of said casing.

15. The machine having rotors and stators as in claim 1 and housing, shell, or casing that has coolant opening(s) that allow media to flow from the furthest radial extent of the segments before ultimately exiting axially between said segment portion and rotor.

16. The machine as in claim 1 that has said winding portions consisting of at least two legs which arc, lean, or bend in opposite directions then bend in the same general direction with spacing between legs allowing a leg to cross a flux source of one direction or polarity while another leg crosses a flux source of the opposite direction or polarity.

17. The machine in claim 1 that has spacers assembled between rotors on a common shaft with said spacers containing fins, slots, grooves, or other treatments to assist movement of coolant between rotor and stator faces.

18. An axial flux electrical machine, having a plurality of circumferentially arranged current-carrying stator segments with distributed stator portions that lie in at least one stator plane perpendicular to the rotational axis and lie in at least one stator plane parallel to said axis with connecting portions spanning a plurality of rotor faces and with conductive segments assembled about a shaft with a plurality of rotors previously installed onto said shaft.

19. The machine in claim 18 that has a stator that is assembled in sections to be placed around said shaft with rotors installed.

20. An axial flux electrical machine, having a plurality of circumferentially arranged current-carrying stator segments with distributed stator portions that lie in at least one stator planes perpendicular to the rotational axis and lie in at least one stator planes parallel to said axis with current flowing in an axial direction along said stator segment over and or between a plurality of rotors prior to flowing radially around the central axis or connecting to any other segment or external device.

* * * * *